United States Patent Office 3,349,108
Patented Oct. 24, 1967

3,349,108
MOLYBDENUM TRIOXIDE COMPLEX WITH DIETHYLENETRIAMINE
William Frank Marzluff, Stamford, Conn., assignor to American Cyanamid Company, Stamford, Conn., a corporation of Maine
No Drawing. Filed Sept. 9, 1963, Ser. No. 307,295
2 Claims. (Cl. 260—429)

The present invention relates to novel molybdenum complexes and to a process for preparing the same. More particularly, the invention is concerned with a molybdenum VI complex with diethylenetriamine. Still more particularly, the invention is directed to a process for preparing the novel molybdenum VI complex of diethylenetriamine by reacting substantially equimolar amounts of diethylenetriamine and molybdenum VI oxide in an aqueous environment and, thereafter, recovering resultant molybdenum VI complex of diethylenetriamine.

It has been long recognized that molybdenum VI does not form any complexes with polyamines. Attempts to synthesize a molybdenum VI complex with ethylenediamine have not been successful. To synthesize such complexes would be highly desirable, for the reason that such complexes could be employed as additives to molten steel to increase its nitrogen content as well as to provide for molybdenum itself as a contributing metal.

It is, therefore, a principal object of the invention to provide a molybdenum VI complex of an amine. It is a further object of the invention to provide a molybdenum VI complex of a specific polyamine. Other objects and advantages will become apparent from a consideration of the following detailed description.

It has been unexpectedly found that molybdenum VI oxide will react with diethylenetriamine in substantially equimolar amounts to form a complex at room temperature, or above. Where other polyamines have been employed in a similar environment, no recoverable product has been observed. As far as is known, the complexing of molybdenum VI oxide with a specific polyamine is totally surprising and at present unexplainable.

In the following example illustrating a preferred mode of reaction, the parts given are by weight.

Example

To a suitable reaction vessel are added 10.3 parts of diethylenetriamine and 7.2 parts of molybdenum oxide. The contents are heated in 100 parts of water with vigorous stirring until solution has occurred. Resultant solution is cooled and diluted to 750 parts by volume by the addition of water. A white solid is thereafter collected as a precipitate and then washed with alcohol and dried under vacuum. Upon analysis, the following data is recorded in percent:

Calculated for $C_4H_{13}N_3MoO_3$: C, 19.4; H, 5.3; N, 17.0.
Found: C, 19.3; H, 5.6; N, 16.8.

The complex of the present invention finds particular utility as an additive to molten steel to increase its nitrogen content as stated above. The method for addition to molten steel is well recognized in the art.

In the present specification, molybdenum VI complex shall mean molybdenum trioxide complex.

I claim:
1. A molybdenum trioxide complex with diethylenetriamine.
2. The process for preparing a molybdenum VI complex which comprises: reacting substantially equimolar amounts of diethylenetriamine and molybdenum oxide in an aqueous environment, and thereafter recovering resultant molybdenum trioxide-diethylenetriamine complex.

References Cited

Abel et al.: "Journal of the Chemical Society" (London), 1959 (Part III), pp. 2323–6.
Watt et al.: "Journal Am. Chem. Soc.," vol. 70 (1948), pp. 2041–2.

TOBIAS E. LEVOW, Primary Examiner.

A. P. DEMERS, Assistant Examiner.